F. KOBLER.
UNLOADING ATTACHMENT FOR CARS.
APPLICATION FILED AUG. 23, 1910.
990,147.
Patented Apr. 18, 1911.
3 SHEETS—SHEET 2.
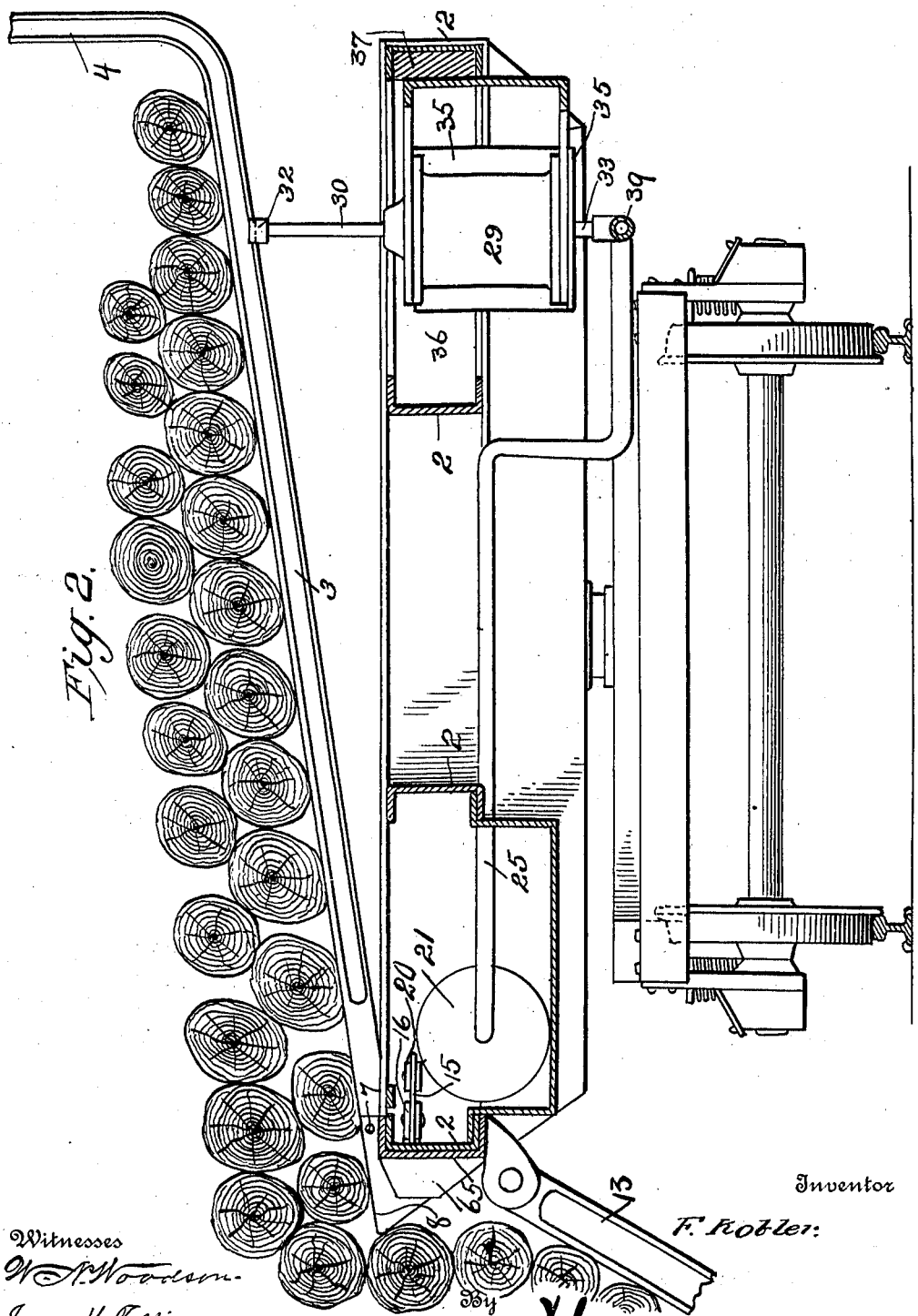

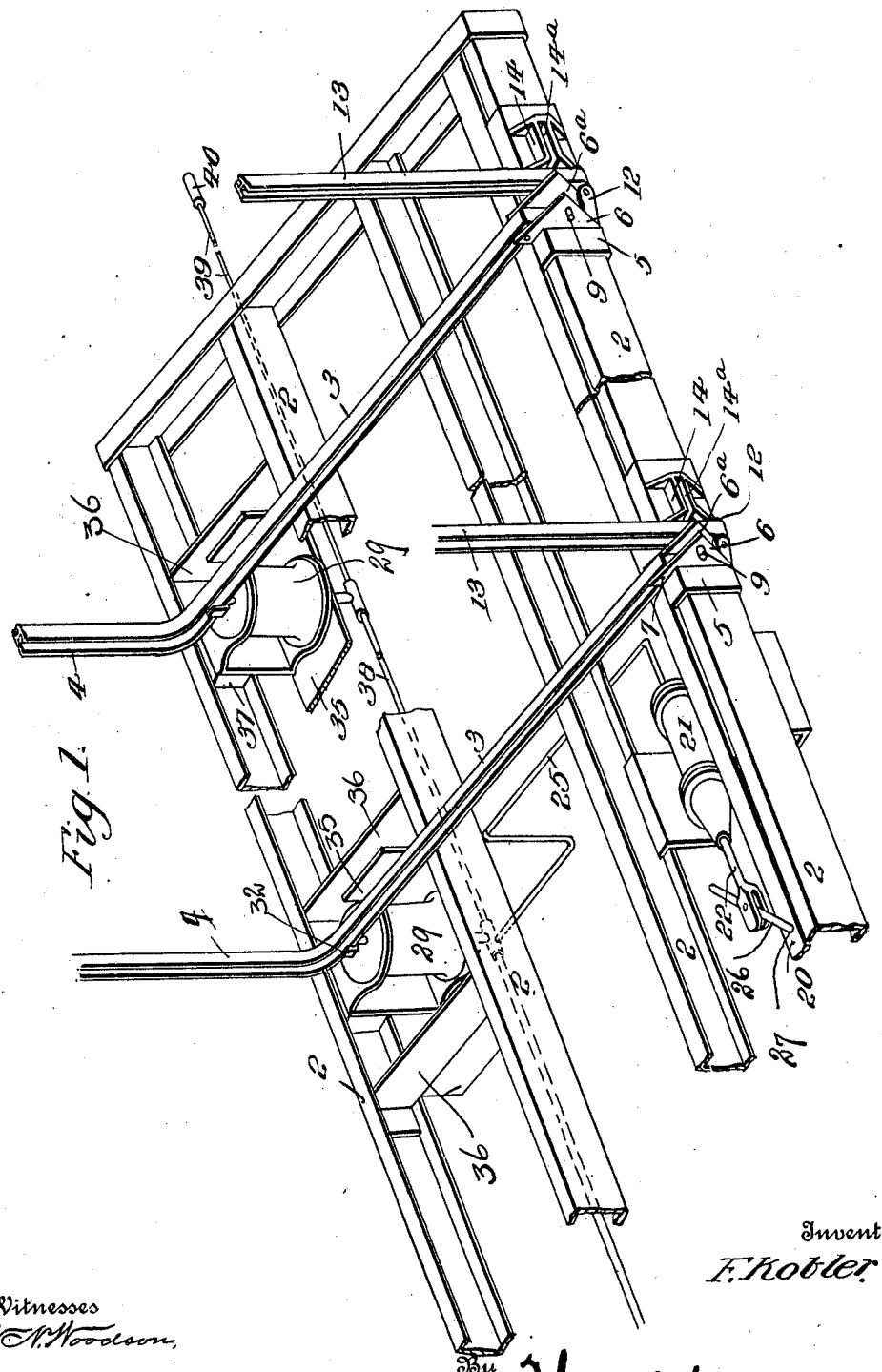

F. KOBLER.
UNLOADING ATTACHMENT FOR CARS.
APPLICATION FILED AUG. 23, 1910.
990,147.
Patented Apr. 18, 1911.
3 SHEETS—SHEET 3.
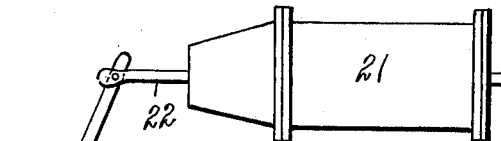
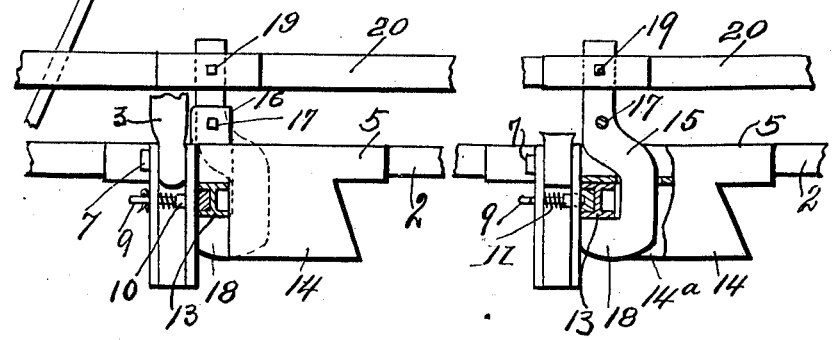
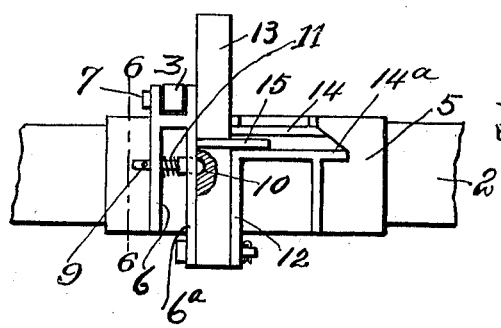
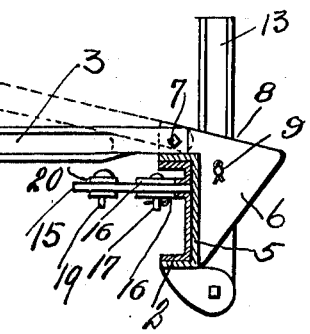
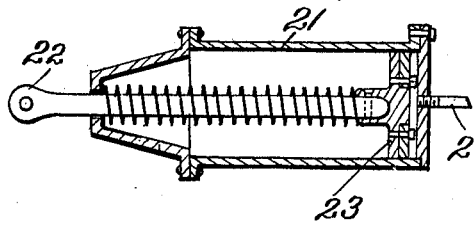
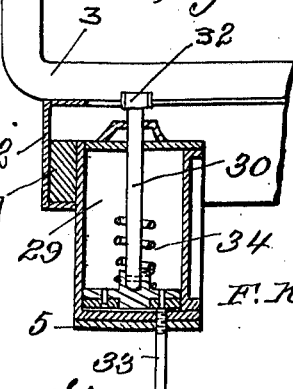
Witnesses
Inventor
F. Kobler
By
Attorneys

UNITED STATES PATENT OFFICE.

FREMONT KOBLER, OF CHIHUAHUA, MEXICO.

UNLOADING ATTACHMENT FOR CARS.

990,147. Specification of Letters Patent. Patented Apr. 18, 1911.

Application filed August 23, 1910. Serial No. 578,523.

*To all whom it may concern:*

Be it known that I, FREMONT KOBLER, citizen of the United States, residing at Chihuahua, Mexico, have invented certain new and useful Improvements in Unloading Attachments for Cars, of which the following is a specification.

My invention relates to an attachment for cars particularly designed for the purpose of supporting logs upon the car platform and unloading the same, and the object of the invention is to provide a very simple and easily operated construction whereby logs may be unloaded from a platform car with a minimum of effort, the device being so constructed that it may be easily operated by two operators.

A further object is to provide a construction in which the unloading devices may be actuated upon any or all of the cars by steam or air from the engine or by compressed air therefrom.

One embodiment of my invention is shown in the accompanying drawings wherein:

Figure 1 is a perspective view of my invention applied to a car platform. Fig. 2 is a transverse section through a car platform showing one of the log supports raised and the logs being unloaded. Fig. 3 is a fragmentary plan view showing the means for locking the car stake in an upright position. Fig. 4 is a like view but with the upper flange of the car stake support broken away. Fig. 5 is a front elevation of the car stake support and pivotal mounting for the log support. Fig. 6 is a transverse section on the line 6—6 of Fig. 5. Fig. 7 is a detail longitudinal sectional view of the cylinder for operating the stake latch. Fig. 8 is a vertical diametrical section of one of the cylinders for operating the log supports.

Referring to these figures 2 designate the longitudinal sills of a platform car of any form or construction but shown as being made of channel iron as is usual, these end walls being connected by transverse beams in any desired manner. I have only shown enough of the car structure to make it clear how my devices are attached thereto, as the exact construction of the car is not a part of my invention and as it is well known to those skilled in the art.

Generally speaking, the unloader includes a plurality of arms or supports which are pivoted to one of the sills of the car, the unloading arms extending entirely across the car and resting upon the other sills when in their normal position. The unloading arms form in effect a tilting platform which is pivotally attached to one side of the frame forming the car platform and which is connected at its other side to piston rods whose pistons are operated by air from the engine. When the air from the engine is turned on the pistons are raised, lifting the tilting platform and causing the logs to roll downward thereon and off of the side of the car. Provision is also made whereby the stakes at the side of the car toward which the logs are unloaded shall be automatically released prior to or at the time that the tilting platform is raised so as to allow these stakes to rotate upon their pivots and turn down into a depending position.

In detail the tilting platform as before remarked, comprises a plurality of transversely extending supporting bars 3, preferably I-beams, one end of each of the supporting arms being upwardly turned as at 4. The other end of each of the supporting arms is pivotally connected to a bracket attached to one of the side sills or channel irons of the car. This bracket comprises a section of channel iron 5 adapted to embrace the channel iron 2 and formed at one end with the outwardly projecting ears 6 and 6$^a$, these ears being spaced from each other as shown in Fig. 5 to receive between them the pivotal end of the corresponding supporting member or bar 3, this supporting member or bar being pivoted by a bolt 7. The upper faces of the ears are inclined downwardly and outwardly as at 8, and the lower edges of the ears are also inclined downwardly and inwardly to the lower edge of the channel iron 5. Passing through these ears 6, 6$^a$ is the detent pin 9 which has an enlarged head 10 and whose body portion is reduced to pass through an opening in the outermost ear 6, this reduced portion being surrounded by a coil spring 11 which acts to force the head of the pin 10 outward through the adjacent ear. The extremity of the pin 10 is rounded as will be seen in Fig. 5 for engagement with the car stake, as will be later described. Parallel with the ear 6$^a$ and spaced therefrom is the downwardly and outwardly extending ear 12, between which ear 12 and the ear 6ª is pivoted the car stake 13 which is preferably formed of a metal beam, I-shape in cross section.

Formed upon the face of the section of the channel iron 5 are the outwardly projecting upper and lower flanges 14 and 14ª which are spaced from each other for the reception of the end of a detaining hook 15, the face of the channel iron 5 being slotted for the passage of this hook, as shown in Fig. 4. The flanges 14 and 14ª form guides for the hook, the hook moving in a horizontal plane between said guides.

Projecting from the rear face of the channel iron 5 and formed therewith or attached thereto in any suitable manner, are the spaced horizontally extending ears 16, between which the shank of the detaining hook 15 is pivoted by a pivot pin 17. The outer end of the shank of the hook is offset so as to accommodate the car stake 13 when the stake is in its upright position, and the outer terminal end of the shank 15 is provided with the laterally extending shoulder 18 which when the detaining hook is in its normal position engages in front of the car stake and holds the same in a vertical position. The rear end of the detaining hook shank extends inward beyond its pivotal point and is pivotally connected at 19 to an operating rod 20. It will be seen that the detaining hooks form in effect latches which hold the car stakes in an upright position or may be actuated to release the same.

There may be as many of the transversely extending supporting bars 3 as desired, though I have shown in the drawing a car as provided with only two of these cross bars. The operating rod 20 extends longitudinally along the car beneath the supporting bars 3 and is pivotally connected to each of the latches or detaining hooks 15 in a manner shown in Fig. 4. It will be obvious that when the rod 20 is moved in one direction that the latches will be moved so as to release the car stakes, and that when the connecting rods are moved in the other direction the latches will engage the car stakes.

For the purpose of operating the connecting rod and therefore operating the latches, I provide a cylinder 21 through which passes a piston rod 22 having a piston 23 of any suitable construction. A coil spring 24 surrounds the piston rod and extends between the piston and the other end of the cylinder so that its tendency is to force the piston inward. The cylinder behind the piston is formed with an air or steam inlet duct 25 whereby air or steam or other suitable motive fluid is admitted to the cylinder so as to act upon the piston to force the piston outward.

The outer extremity of the piston rod 22 is pivotally connected to a lever 26 which is pivoted at 27 to the upper flange of the channel iron sill 2. The lever 26 is pivoted intermediate its ends to the connecting rod 20. The cylinder 21 is connected by the duct 25 to a source of air or steam on the engine, and it will be obvious that when steam or air or other motive fluid are sent into the cylinder that the piston will be operated to shift the connecting rod and thus release all the latches from their engagement with the car stakes, and that when the pressure of motive fluid on the piston is relieved that the spring 24 will act to force the piston inward and thus close the latches and engage them with the car stakes. The car stakes are provided on one side with a very shallow socket 28 with which the detent pin 9 engages so that the detent pin will act to hold the car stake in an upright position, even though the detaining hooks or latches are not used.

In order to provide means for lifting the supporting bars 3 at one end so as to tilt the same, I preferably provide a plurality of cylinders 29, each of like construction and each having therein a piston 30 provided with a piston rod 31 which extends vertically upward through the cylinder 29 and is provided at its upper end with a crutch 32 forming a seat for the corresponding supporting bar 3. The cylinder or steam chest 29 is provided at its lower end with an inlet duct 33 whereby steam, air or other motive fluid may be admitted to the cylinder to actuate the piston.

In order to prevent shock to the piston the piston rod is preferably surrounded by a relatively short coil spring 34 which is attached to the head end of the piston rod, this spring when the piston has been forced upward through a certain distance contacting with the head of the cylinder and thereby preventing the piston from pounding against the upper end of the cylinder. Each cylinder is preferably supported upon a hanger 35 which is attached at its ends to transverse supporting bars 36 which are attached at one end to the outer sill 2, and at the other end to the next adjacent sill, as shown in Fig. 1. In order to steady the cylinder it is bolted or otherwise connected to the channel iron forming the outermost sill 2, a filling block 37 filling the space between the flanges of the channel iron. It will be obvious that any suitable means of mounting these cylinders 29 may be used.

The duct 25 is connected to a train pipe 38 which is also connected to the duct 33 that connects to the cylinders 29. The train pipe 38 is provided at its ends with a hose and coupling 39 whereby connection may be made between cars, this coupling being provided with a cut-off cock 40 of any suitable construction. The locomotive handling the cars is equipped with means whereby steam, air or other motive fluid may be directed into the train pipes or the pressure relieved in the train pipes. Normally there is no air, steam or other fluid within the train pipes. Air is directed into the train pipes only at the time that the cars are being actually unloaded.

The logs are laid longitudinally so as to rest upon the supporting bars 3, the stakes 13 being all raised and held in position by the latches 15. When it is desired to unload the car the engineer on the locomotive applies the air or steam, directing said air, steam or other motive fluid into the pipe line. The motive fluid causes the piston 23 in the cylinder 21 to move outward, thus actuating the rod 20 and releasing all of the latches 15, whereupon all of the stakes 13 will fall outward and downward. At the same time the air or motive fluid will enter the cylinders 29, raise the pistons therein, and all of the supporting members or bars 3 will be simultaneously raised so as to take an inclined position, as shown in full lines in Fig. 2. The logs which rest upon these supporting bars will now roll downward and roll off the car. The air or other motive fluid is held on until the stakes 13 are raised. These stakes are raised by hand, and as they move into a vertical position the detent pin 9 will engage with the stakes and hold them in their vertical positions. When all the stakes have been raised the air or motive fluid is released, whereupon the connecting rod 20 will move in the opposite direction to throw the latches into engagement with the stakes and at the same time the pistons in the cylinders 29 will sink, thus lowering the free ends of the supporting bars 3 ready for another load.

I have found in practice that two men can unload a long string of cars by this construction, one of the men being on the engine and one of the men being with the cars. It is to be noted that the logs are all dumped simultaneously and without any manual actuation except that of the engineer, and that then the car stakes are replaced in their upright position by hand. The attachment saves a great deal of time and labor and entirely eliminates the manual removal of car stakes, the prying loose of the logs and jacking of them forward, and prevents any tearing off of the side sills on the cars.

While I have shown what I believe to be the preferable form of my invention, I do not wish to be limited either to the exact arrangement shown or to the details of construction as it is obvious that many changes might be made without departing from the spirit of the invention.

What I claim is:

1. The combination with the platform of a car, of a plurality of transversely extending log-supporting bars, each pivotally mounted upon a side sill of the car, the free ends of said supporting bars being extended upwardly, and independent means located beneath the free end of each of said bars for raising or lowering the said bars.

2. The combination with a car platform, of transversely extending log supporting bars, each pivotally mounted at one end to the side sill of the car, the free ends of said log supporting bars being upwardly turned, means for simultaneously raising the free ends of all of the log supporting bars to an inclined position or lowering them to a horizontal position, and car stakes pivotally attached to the side sills of the car to which the supporting bars are pivotally mounted.

3. The combination with a car platform, of a plurality of transversely extending log supports, each of said log supports being pivotally mounted at one end upon the side sill of the car, means for simultaneously raising the free ends of all of the log supports, car stakes pivoted to the car platform adjacent to the pivoted ends of the log supports, and means for holding these car stakes in a vertical position.

4. The combination with a car platform, of a plurality of transversely extending log supports, each of said log supports being pivotally mounted at one end upon the side sill of the car, means for simultaneously raising the free ends of all of the log supports, car stakes pivoted to the car platform adjacent to the pivoted ends of the log supports, and means for holding said car stakes in a raised position and permit them to fall to a depending position.

5. The combination with a car platform, of a transversely extending log support pivotally mounted at one end to the side sill of the platform, means for raising the free end of the log support, a car stake pivoted to the car platform, a latch for holding said car stake in an upright position, and means for simultaneously raising the free end of the log support and releasing the latch to permit the car stake to fall.

6. The combination with a car platform, of a plurality of transversely extending log supports pivotally mounted each at one end to the side sills of the car platform, car stakes pivoted to said side sills adjacent to the pivoted ends of the log supports, latches for holding said stakes in an upright position, and means for simultaneously releasing said latches to permit the stakes to fall and raising the free ends of the log supports.

7. The combination with a car platform having side sills, of a plurality of transversely extending log supporting bars, each pivoted at one end to one of the side sills, the free end of each bar being upwardly turned, a cylinder disposed beneath the free end of each log supporting bar and having a piston thereon and a piston rod engaging with the free end of the log supporting bar, and means whereby fluid may be applied into the cylinders and beneath the piston to raise the free ends of the log supporting bars or whereby said fluid may be simultaneously released from said cylinder to permit the log supporting bars to fall.

8. The combination with a car platform, of a transversely extending log support pivoted at one end to the car platform, a car stake pivoted to the car platform adjacent to the pivoted end of the log support, a latch for holding the car stake in an upright position, and pressure-actuated means for simultaneously releasing the latch and for raising the free end of the log support.

9. The combination with a car platform, of a transversely extending log support pivoted at one end to the car platform, a car stake pivoted to the car platform adjacent to the pivoted end of the log support, a latch for holding the car stake in an upright position, a cylinder located beneath the free end of the log support and having a piston engaging with said log support, a cylinder having a piston therein operatively engaged with the latching device, and means for directing motive fluid into both of said cylinders to simultaneously operate the latching device to release the stake and raise the free end of the log support.

10. The combination with a car platform, of a transversely extending log support thereon pivoted at one end to the car platform, a car stake pivoted to the car platform adjacent to the pivoted end of the log support, means for raising and lowering the free end of the log support, a spring-actuated detaining pin engaging with the car stake to hold it in a vertical position, said detaining pin having a rounded face entering a shallow socket in the stake, a latching device for positively holding the car stake in an upright position, and pressure-actuated means for releasing said latch simultaneously with the elevation of the end of the log support.

11. The combination with a car platform composed of parallel sills, of a section of channel iron adapted to embrace one of the outermost sills, said section being provided with outwardly projecting ears spaced from each other in vertical planes, a log supporting member pivoted between said ears and adapted to extend transversely across the car platform when in a lowered position, a car stake pivoted between the ears on the section of channel iron for rotation in a vertical plane, a hook-shaped latch also pivoted on the channel iron and operating in horizontal guides thereon, the hooked end of the latch being adapted to engage over the car stake, pressure-actuated means mounted on the car platform and engaging with the free end of the log-supporting member to raise and lower the same, pressure-actuated means operatively engaging with the hook-shaped latch to move it in one or the other direction to engage or release the car stake, and means for directing motive fluid into both of said pressure-actuating means for raising the free end of the log support and for releasing the latch.

12. The combination with parallel side sills of a car, of a plurality of pairs of spaced ears attached to one of said side sills, said ears having their upper edges downwardly and outwardly inclined and a plurality of transversely extending log supporting bars, one end of each of said bars being pivotally mounted between each pair of ears, and means for simultaneously raising the free ends of all of said supporting bars.

13. The combination with the platform of a car and side sills upon which the platform is supported, of a plurality of metallic brackets attached to one of said side sills, each of said brackets having a pair of upwardly projecting spaced ears, the upper edges of the ears being downwardly and outwardly inclined and a plurality of log supporting bars, each of said bars being pivoted between one of said pairs of ears, said log supporting bars extending across the platform of the car and being then extended upward, and means for simultaneously raising the free ends of all the supporting bars to incline the same, the upper face of each supporting bar being in a plane coincident with the upper inclined edges of said ears.

In testimony whereof, I affix my signature in presence of two witnesses.

FREMONT KOBLER. [L. S.]

Witnesses:
CHAS. J. STURTEVANT,
CHAS. A. BROWN.

---

Copies of this patent may be obtained for five cents each, by addressing the "Commissioner of Patents, Washington, D. C."